(12) United States Patent
Aury

(10) Patent No.: US 10,730,629 B2
(45) Date of Patent: Aug. 4, 2020

(54) STOP FOR AIRCRAFT SEAT

(71) Applicant: Safran Seats, Plaisir (FR)

(72) Inventor: Nicolas Aury, Issoudun (FR)

(73) Assignee: Safran Seats, Plaisir (FR)

( * ) Notice: Subject to any disclaimer, the term of this patent is extended or adjusted under 35 U.S.C. 154(b) by 0 days.

(21) Appl. No.: 16/072,685

(22) PCT Filed: Jan. 26, 2017

(86) PCT No.: PCT/EP2017/051674
§ 371 (c)(1),
(2) Date: Jul. 25, 2018

(87) PCT Pub. No.: WO2017/129692
PCT Pub. Date: Aug. 3, 2017

(65) Prior Publication Data
US 2019/0031355 A1 Jan. 31, 2019

Related U.S. Application Data

(60) Provisional application No. 62/287,132, filed on Jan. 26, 2016.

(51) Int. Cl.
*A47B 97/00* (2006.01)
*B64D 11/06* (2006.01)
*B60N 2/015* (2006.01)

(52) U.S. Cl.
CPC ...... *B64D 11/0696* (2013.01); *B60N 2/01558* (2013.01)

(58) Field of Classification Search
CPC .... B60N 2/067; B60N 2/0705; B60N 2/0715; B64D 2/01558

USPC ........ 248/503.1, 424, 429; 296/65.01, 65.11, 296/65.13, 65.15; 297/311, 331, 344.1
See application file for complete search history.

(56) References Cited

U.S. PATENT DOCUMENTS

2008/0191115 A1* 8/2008 Stubbe ............... B64D 11/0696
248/503.1
2010/0124457 A1* 5/2010 Cook ................. B60N 2/01558
403/409.1

FOREIGN PATENT DOCUMENTS

| EP | 1607329 | 12/2005 |
|---|---|---|
| EP | 1803645 | 7/2007 |
| WO | 2012100152 | 7/2012 |

OTHER PUBLICATIONS

International Patent Application No. PCT/EP2017/051674, Written Opinion of the International Searching Authority (including English translation), dated Apr. 25, 2017.
International Patent Application No. PCT/EP2017/051674, International Search Report and Written Opinion, dated Apr. 25, 2017.

* cited by examiner

*Primary Examiner* — Todd M Epps
(74) *Attorney, Agent, or Firm* — Kilpatrick Townsend & Stockton LLP

(57) ABSTRACT

A stop for an aircraft seat is designed to be installed on a rail, said rail having, in alternation, bearing regions, in which two lips that are oriented toward one another project toward the interior of the rail, and open regions. The stop includes a body provided with a plunger which is designed to fit into an open region in said rail so as to abut against lips of a bearing region, and at least one means for holding the stop on said rail.

9 Claims, 6 Drawing Sheets

STOP FOR AIRCRAFT SEAT

CROSS-REFERENCE TO RELATED APPLICATIONS

This application is a national phase entry under 35 USC § 371 of International Patent Application No. PCT/EP2017/051674 ("the '674 application"), filed Jan. 26, 2017, and entitled STOP FOR AIRCRAFT SEAT, which claims priority to and benefits of U.S. Patent Application No. 62/287,132 ("the '132 application"), filed on Jan. 26, 2016, and entitled SEAT TRACK FITTING STOP. The '674 application and the '132 applications are hereby incorporated in their entireties by this reference.

FIELD OF THE INVENTION

The present invention relates to a stop for an aircraft seat. The invention is used particularly advantageously, but not exclusively, with business-class aircraft seats in association with an item of furniture.

As represented in FIG. 1, an aircraft seat support pallet 1 comprises, in a manner known per se, a reinforcement panel 2 as well as a front beam 3 and a rear beam 4 located on both sides of the reinforcement panel 2.

The mounting of this assembly is carried out by means of two spars 5 each provided with a groove 8 receiving an edge of the reinforcement panel 2. The fastening between each spar 5 and the panel 2 is carried out, for example, by riveting. Moreover, each spar 5 comprises at each of its ends a recess 9 for receiving the front beam 3 and the rear beam 4, respectively. The fastening of the beams 3, 4 to the spars 5 can be carried out, for example, by means of bolts or any other appropriate fastening device.

The support pallet 1 moreover comprises fastening devices 11 for fastening to the aircraft seat as well as fastening devices 12 for fastening to an item of furniture associated with the seat. The pallet 1 is also provided with fasteners 15 for fastening the pallet 1 to rails 16 running along the floor of the aircraft cabin.

In this case, as one can see in FIG. 2, each fastener 15 comprises a hollow body 19 in which a pin 20 is mounted, which pin is mobile in translation with respect to the body 19 for holding the fastener 15 to the rail 16 by clamping. For this purpose, the rail 16 has, in alternation, bearing regions 161, in which two lips 23 that are oriented toward one another project toward the interior of the rail 16, and open regions 162, in which a length of the lips 23 facing one another is reduced or even zero, as illustrated in FIG. 3.

The pin 20 has a threaded end 25 cooperating with a threaded bore of a hollow screw 26. Thus, the rotation of the screw 26 by the operator by means of a suitable tool makes it possible to raise the pin 20, in such a manner that the lips 23 of a bearing region 161 of the rail 16 are clamped between a radial end flange 28 of the pin 20 and the body 19 of the fastener 15.

BACKGROUND

Now, it has been observed that in the case of a crash, the strong stresses to which the seat and the rails 16 are subjected can produce a sliding of the fastener 15 in the interior of the rail 16 in direction D, which can lead to the pin 20 coming out through the open region 162 adjacent to the bearing region 161 of the fastener 15, as shown in FIG. 3.

SUMMARY OF THE INVENTION

The aim of the invention is to effectively remedy this disadvantage by proposing a stop for an aircraft seat, which stop is designed to be installed on a rail, said rail having, in alternation, bearing regions, in which two lips that are oriented toward one another project toward the interior of the rail, and open regions,
characterized in that said stop comprises:
a body provided with a plunger which is designed to fit into an open region in said rail so as to abut against lips of a bearing region, and
at least one means for holding the stop on said rail.

The invention thus enables, by means of the plunger abutting against the lips of the rail, limiting of the displacement of the pin of the fastener of the seat in the interior of the rail so as to prevent the pin from coming out of the rail in the case of a crash.

According to an embodiment, the holding means comprises a portion which is mobile in translation with respect to the body, said mobile portion being provided with at least one transverse flange for clamping a lip of the rail between said transverse flange and the body of the stop.

According to an embodiment, said stop comprises two sets of transverse flanges located on both sides of the plunger.

Another subject matter of the invention is an assembly characterized in that it comprises:
a seat support pallet having fastening devices for fastening to the aircraft seat and at least one fastener for fastening to an aircraft cabin rail, and
a stop as defined above according to any one of the preceding claims, said stop being mounted on said rail spaced apart from said fastener.

According to an embodiment, a spacing between the stop and the fastener is between 2 mm and 3 mm.

According to an embodiment, a shock absorbing element is mounted between a beam of the seat support pallet and an aircraft cabin rail.

According to an embodiment, the shock absorbing element protrudes with respect to an aircraft cabin floor.

According to an embodiment, the shock absorbing element comprises:
a body,
a portion made of a resilient material fastened to the body, and
at least one means for holding the stop on the rail.

According to an embodiment, the shock absorbing element is provided with a plunger which is designed to fit into an open region of said rail so as to abut against lips of a bearing region.

According to an embodiment, the shock absorbing element comprises a portion which is mobile in translation with respect to the body, said mobile portion being provided with at least one transverse flange for clamping the rail between the transverse flange and the body of the shock absorbing element.

Naturally, the different features, variants and/or embodiments of the present invention can be combined with one another in various combinations, to the extent that they are not incompatible or mutually exclusive.

BRIEF DESCRIPTION OF THE DRAWINGS

The present invention will be understood better, and other features and advantages will also become apparent upon reading the following detailed description including embodiments given as illustration in reference to the appended figures which are presented as non-limiting examples that can be used to complete the understanding of the present invention and the presentation of its implementation, and, if applicable, contribute to its definition, in which.

DETAILED DESCRIPTION

Figure 1:
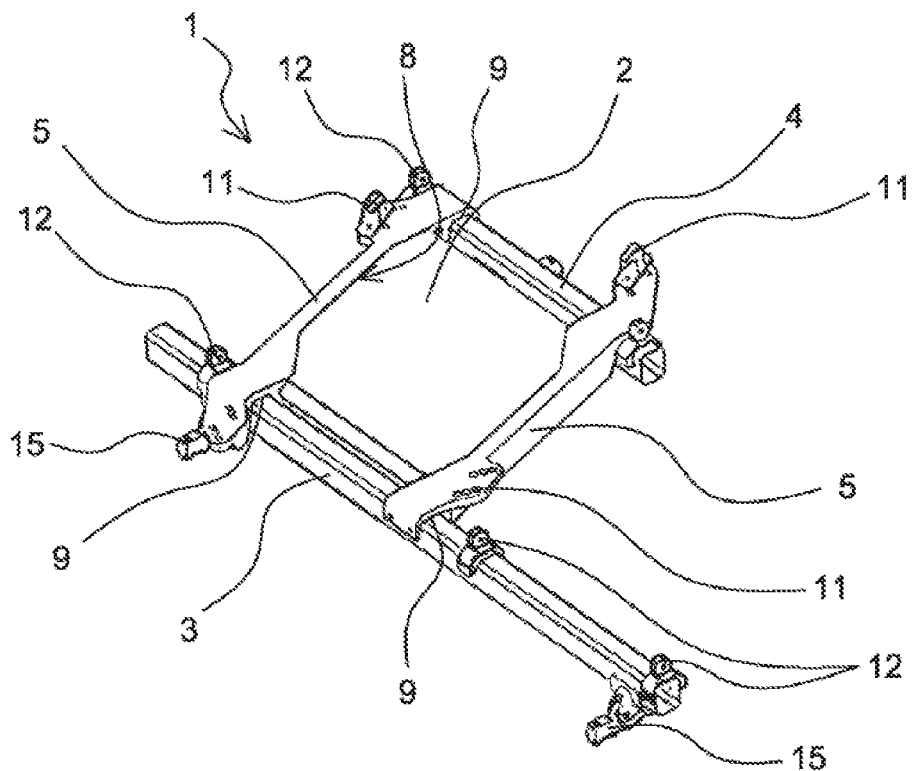
FIG. 1 is a perspective view of a support pallet supporting the seat and the corresponding item of furniture, which is designed to be fastened to rails of an aircraft cabin.
Figure 2:
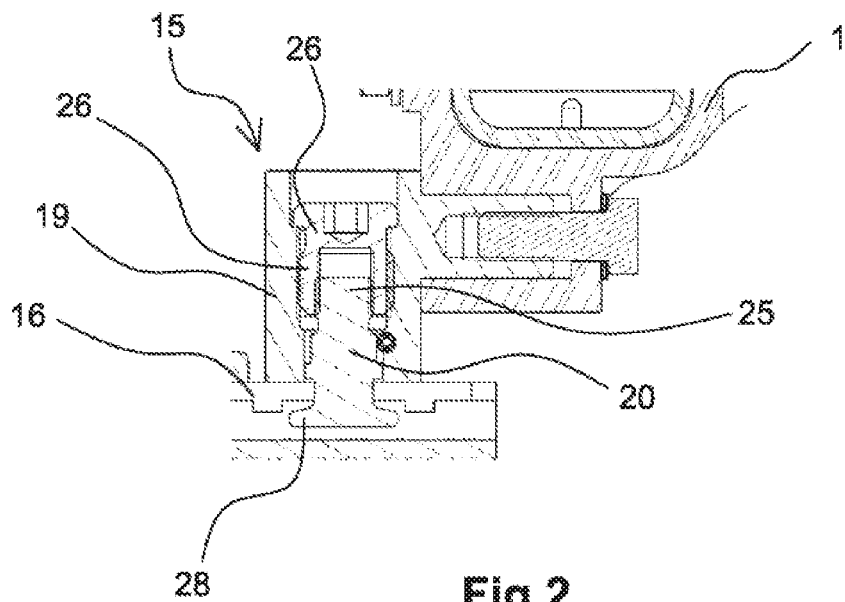
FIG. 2 is a cross-sectional view of a seat fastener of the support pallet of FIG. 1.
Figure 3:
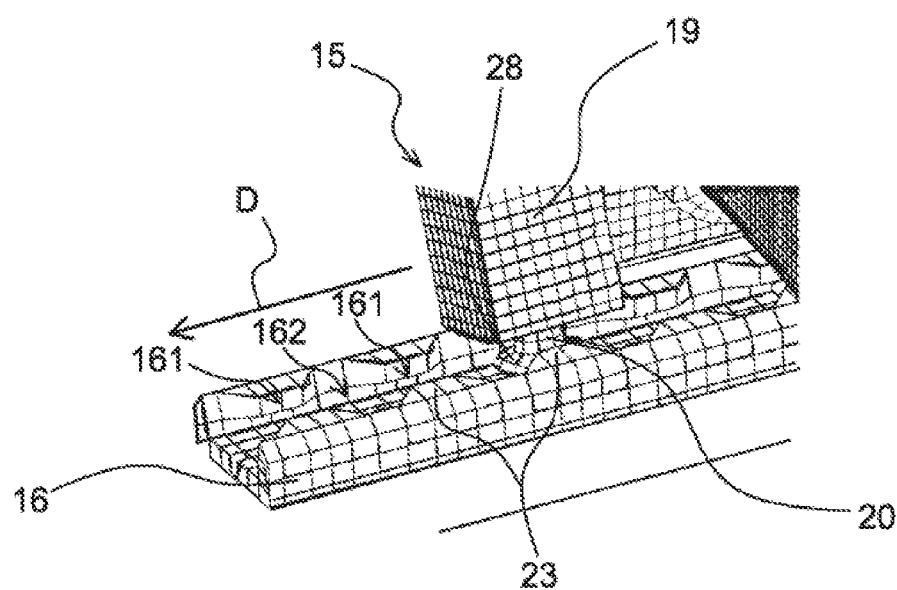
FIG. 3 is a perspective view illustrating the displacement of the seat fastener in the rail during a crash.

It should be noted that, in the Figures, the structural and/or functional elements common to the different embodiments can have the same reference numerals. Thus, unless otherwise indicated, such elements have identical structural, dimensional and material properties.

Moreover, the relative terms such as "front" and "rear" are understood in reference to a seat in installation position in the aircraft cabin, a "rear" element being located on the backrest side, and a "front" element being situated on the opposite side from the backrest of the seat.

FIG. 1 shows a support pallet 1 for an aircraft seat provided with a reinforcement panel 2 as well as a front beam 3 and a rear beam 4 located on both sides of the reinforcement panel 2.

The mounting of this assembly is carried out by means of two spars 5 each provided with a groove 8 receiving an edge of the reinforcement panel 2. The fastening between each spar 5 and the panel 2 is carried out, for example, by riveting. Moreover, each spar 5 comprises at each of its ends a recess 9 for receiving the front beam 3 and the rear beam 4, respectively. The fastening of the beams 3, 4 to the spars 5 can be carried out, for example, by means of bolts or by any other appropriate fastening device.

The support pallet 1 moreover comprises fastening devices 11 for fastening to the aircraft seat s well as fastening devices 12 for fastening to an item of furniture associated with the seat The pallet 1 is also provided with fasteners 15 ensuring the fastening of the pallet 1 to the rails 16 running along the floor of the aircraft cabin.

Figure 4:
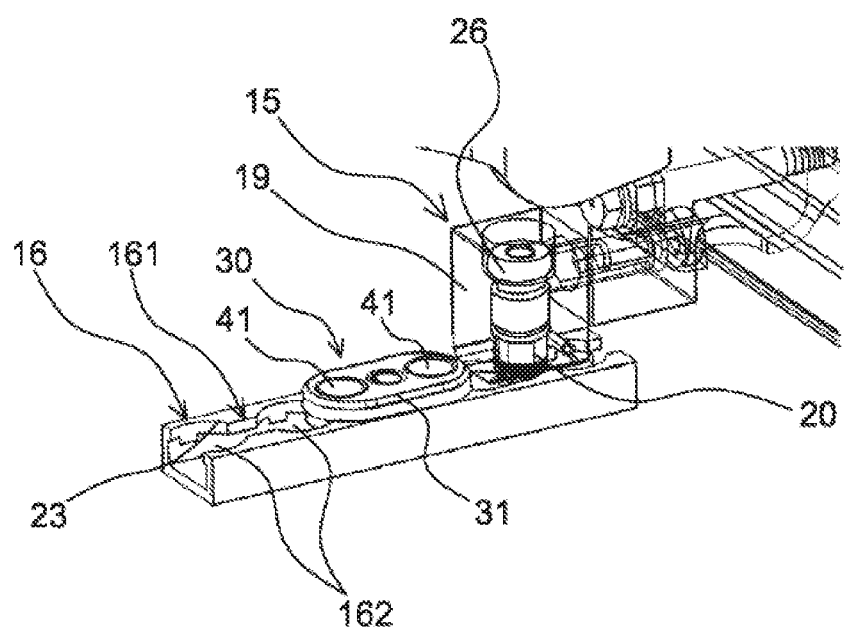
FIG. 4 is a perspective view illustrating the installation of a stop according to the invention in front of the seat fastener.
Figure 5:
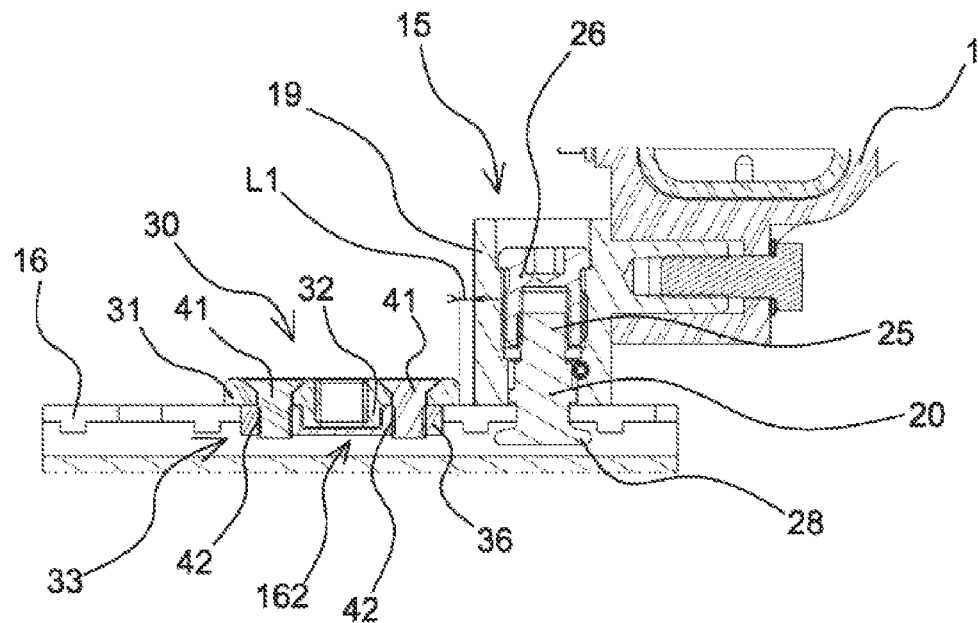
FIG. 5 is a cross-sectional view of the seat fastener and of the stop according to the invention.

In this case, as one can see in FIGS. 4 and 5, the fastener 15 comprises a hollow body 19, in which a pin 20, which is mobile in translation with respect to the body 19, is mounted, in order to enable holding by clamping of the fastener 15 on the lips 23 of the rail 16.

For this purpose, the pin 20 has a threaded end 25 cooperating with a threaded bore of a hollow screw 26. Thus, the rotation of the screw 26 by the operator by means of an appropriate tool makes it possible to raise the pin 20 in such a manner that the lips 23 of a bearing region 161 of the rail 16 are held gripped between a radial end flange 28 of the pin 20 and the body 19 of the fastener 15.

Moreover, a stop 30 is installed on the rail 16 having, in alternation, bearing regions 161, in which two lips 23 oriented toward one another protrude toward the interior of the rail 16, and open regions 162 in which a length of the lips 23 facing one another is reduced or even zero.

Figure 6:
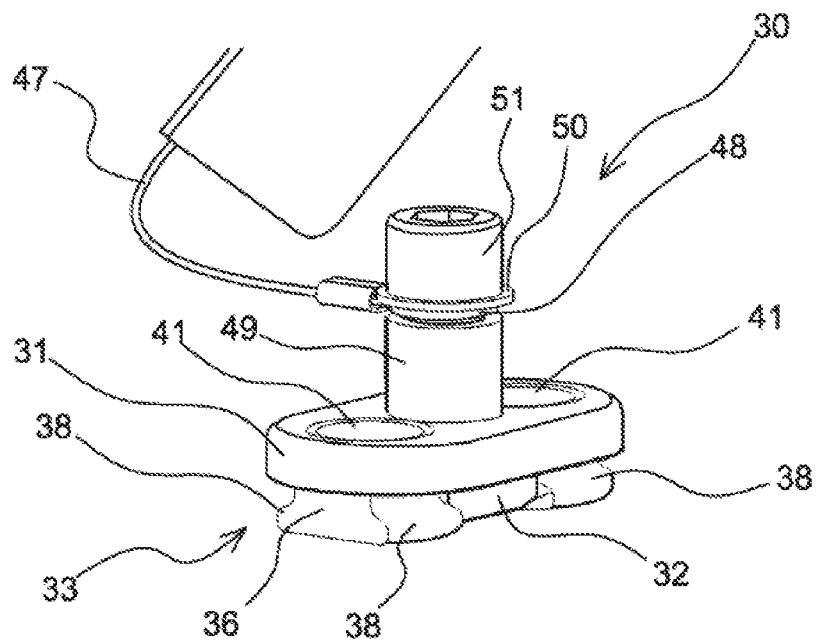
FIG. 6 is a perspective view of a stop according to the invention.
Figure 7:
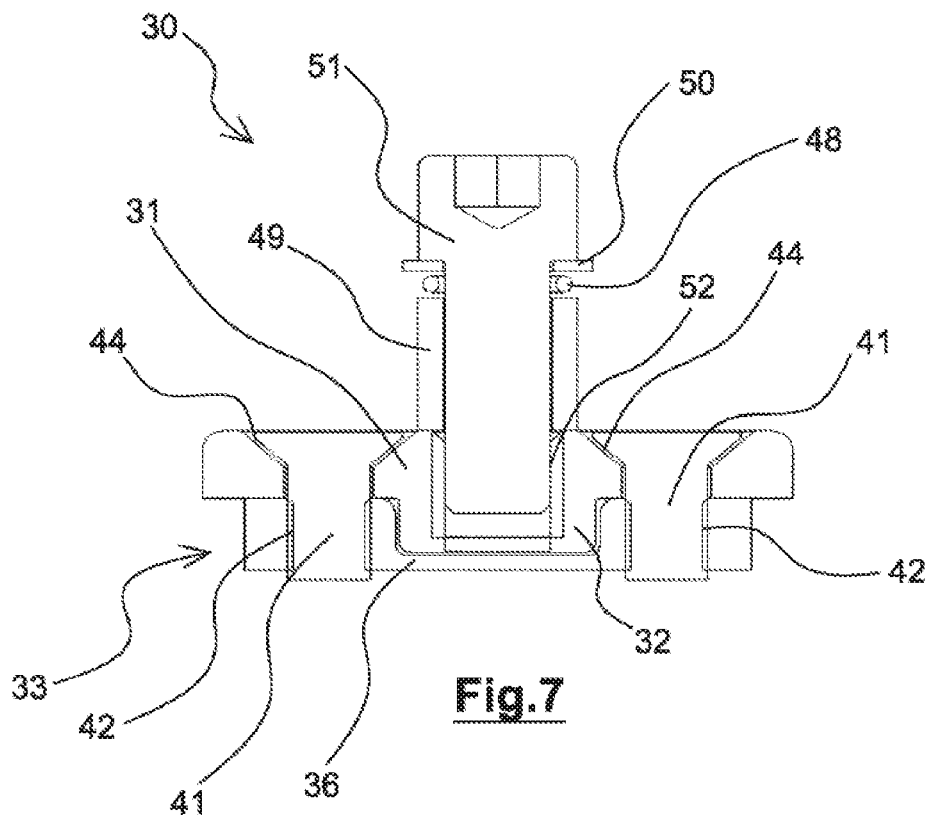
FIG. 7 is a cross-sectional view of a stop according to the invention.

As can be seen in FIGS. 5, 6 and 7, the stop 30 comprises a body 31 provided with a plunger 32 extending projecting with respect to the rear face of the body 31. This plunger 32 is designed to fit in an open region 162 of the rail 16 so as to abut against lips 23 of an adjacent bearing region 161.

The stop 30 moreover comprises a means 33 for holding the stop on the rail 16. This holding means 33 comprises a portion 36 which is mobile in translation with respect to the body 31. The mobile portion 36 is provided with transverse flanges 38 for clamping a lip 23 of the rail 16. In this case, the mobile portion 36 comprises two sets of two flanges 38 located on both sides of the plunger 32 and mechanically connected to one another. In each set, the flanges 38 are oriented transversely, that is to say substantially perpendicularly to the longitudinal direction of the rail 16 in two opposite directions with respect to one another as shown in FIG. 6, For this purpose, screws 41 penetrate into threaded bores 42 produced in the body 31 and the mobile portion 36, in such a manner that a rotation of the screws 41 by means of an appropriate tool makes it possible to produce a displacement of the mobile portion 36 in the direction of the body 31, in order to ensure a clamping of a lip 23 between the flanges 38 and the body 31 of the stop 30. The body 31 can comprise recesses 44, which are each designed to receive a corresponding screw head, as shown in FIG. 7. In this way, the screw heads are prevented from protruding after placement of the stop 30.

Moreover, as illustrated in FIGS. 6 and 7, a cable 47 for retaining the stop 30 can be provided, ensuring a linkage between the stop 30 and the corresponding seat. For this purpose, the cable 47 ends with a collar 48 inserted axially between a spacer 49 and a washer 50, which bears against the head of a screw 51 inserted in a central bore 52 of the body 31 for holding the assembly. The spacer 49 is preferably mounted with play around the screw 51.

Preferably, as can be seen in FIG. 5, the stop 30 is positioned spaced apart from the corresponding seat fastener 15. This spacing should not be too small, because that would result in mechanical problems capable of destroying the body 31 of the fastener 15 and/or the lip 23 of the rail 16. In addition, this spacing should not be excessively large, so as to effectively retain the fastener 15 in the interior of the rail 16. A good compromise is obtained by means of a spacing L1 between the stop 30 and the fastener 15 between 2 mm and 3 mm.

Figure 9:
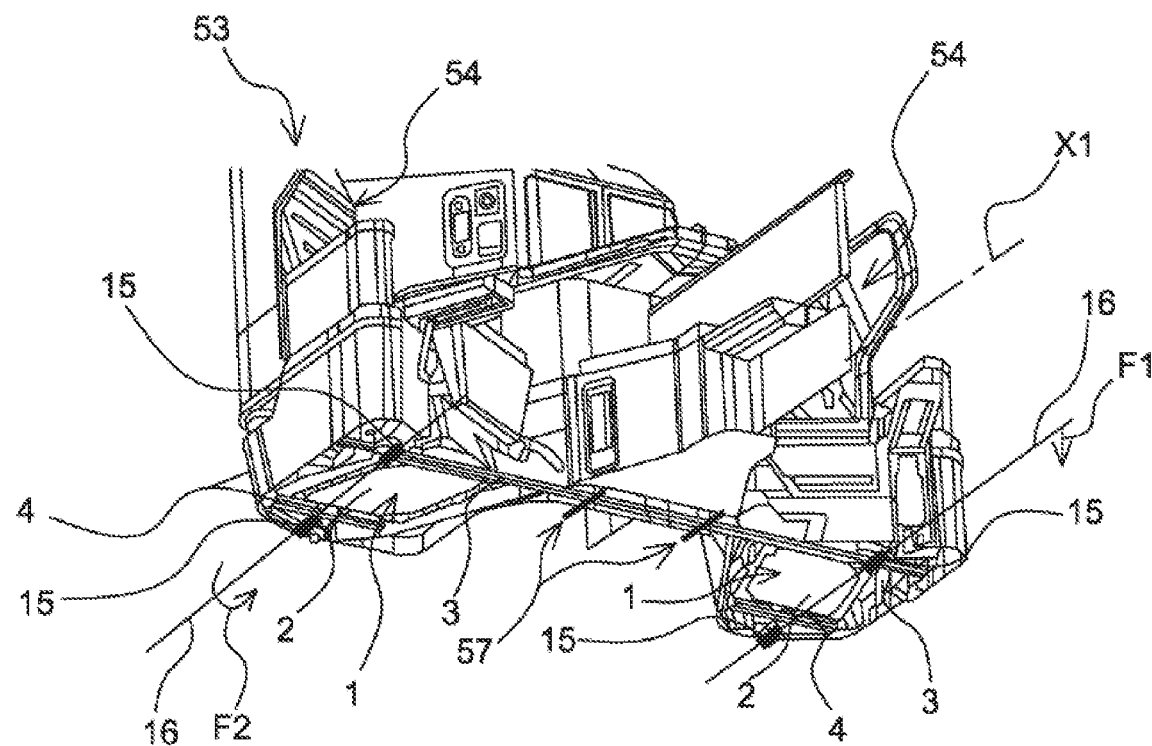
FIG. 9 is a perspective view illustrating the positioning of two shock absorbing elements which are designed to be inserted between an assembly of two seats and rails of the aircraft cabin.

In the case of an assembly 53 of two seats 54 side by side, such as a chevron configuration of seats, in which the axes of the seats 54 form a non-zero angle with respect to one another, two support pallets 1 are assembled to one another in particular by means of their front beam 3, as illustrated in FIG. 9. The assembly is fastened to the rails 16 by means of the corresponding fasteners 15.

Figure 8:
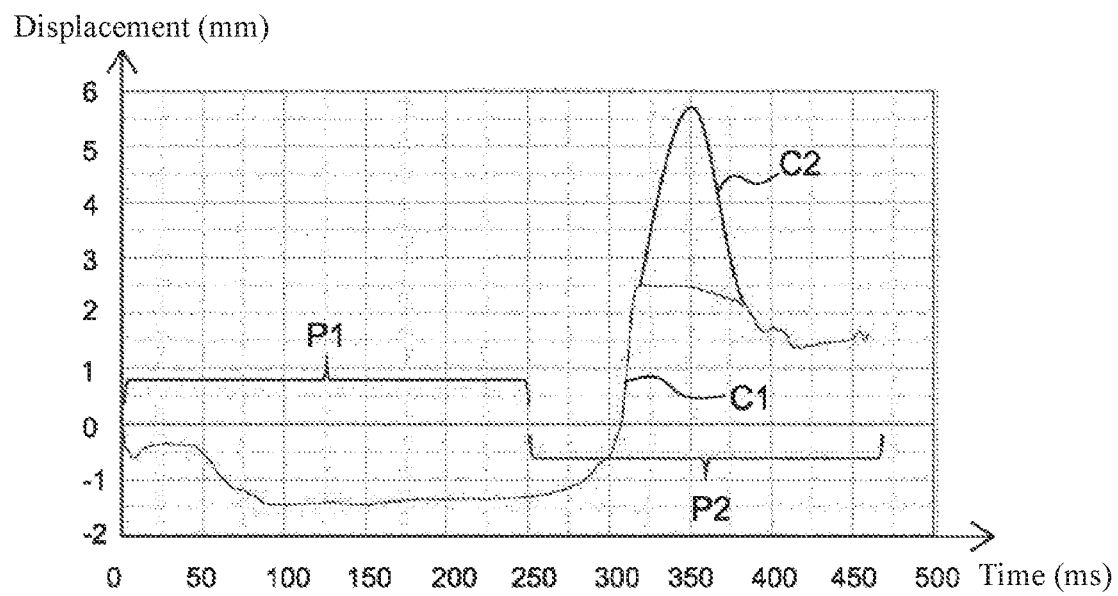
FIG. 8 is a graphic representation showing the change versus time of a displacement of the fastener in the interior of a rail during a crash test respectively for a seat fastener alone and for a fastener associated with a stop.

As can be seen in FIG. 8, in a phase P1 of deformation of the floor, called "pitch and roll" in English, during which a stress is imparted on one of the rails 16 so as to cause it to descend by 10 degrees toward the bottom along arrow F1, and a stress is imparted on the other rail 16 so as to cause it to pivot by 10 degrees along arrow F2, the fastener 15 alone and the fastener 15 associated with a stop 30 have similar displacements in the interior of the rail 16. These displacements are negative, since they correspond to rearward movements of the fastener 15 on the rail 16.

During the phase P2 in which a peak of abrupt deceleration on the order of 16 g is applied to the assembly, the fastener 15 alone exhibits a large positive displacement toward the front, capable of causing the fastener 15 to come out (see curve C1), while the stop 30 enables the retaining of the associated fastener 15 (see curve C2). In this case, the displacement of the fastener 15 is stopped at 2.5 mm, which corresponds to the positioning of the stop 30 with respect to the corresponding fastener 15.

Moreover, in FIG. 9, one sees that the fasteners 15 are located at the ends of the assembly 53 of two seats, which produces great mechanical stresses in the central portion which is raised.

In order to remedy this, two shock absorbing elements 57 are positioned in this central portion on both sides of the symmetry axis X1 of the assembly 53. Each shock absorbing element 57 is mounted between a front beam 3 of a support pallet 1 and a corresponding rail 16.

Figure 10:
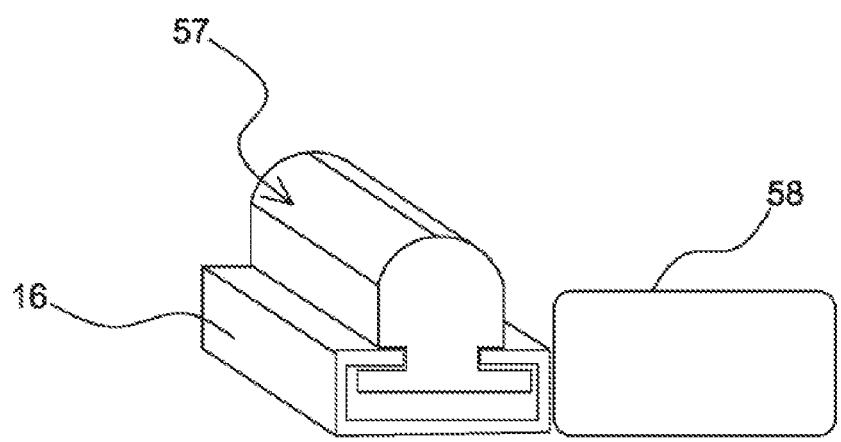
FIG. 10 is a diagrammatic perspective view illustrating the configuration of the shock absorbing element and its positioning with respect to the floor of the aircraft.

As one can see in FIG. 10, the shock absorbing element 57 protrudes with respect to the floor 58 of the aircraft cabin.

Figure 11:
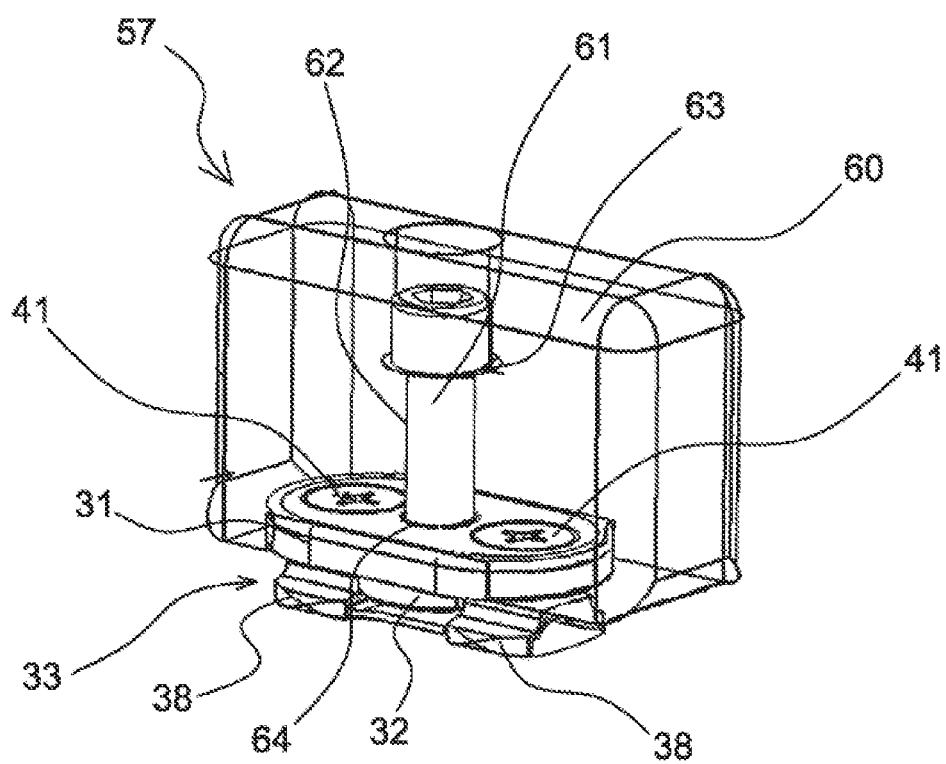
FIG. 11 is a perspective view illustrating a possible embodiment of the shock absorbing element.

In an embodiment example shown in FIG. 11, the shock absorbing element 57 comprises a body 31 and a portion 60 produced out of a resilient material held by a screw 61 on the body 31. For this purpose, the portion 60 comprises a through-hole 62 provided with two sections having different diameters, defining a shoulder 63 against which the head of the screw 61 bears. The screwy 61 is screwed into a threaded bore 64 of the body 31. The resilient portion 60 can be made, for example, of rubber or of an elastomer material.

Like the stop 30, the shock absorbing element 57 can comprise a plunger 32 which is designed to fit into an open region 162 of the rail 16 so as to abut against lips 23 of a bearing region.

The means 33 for holding the stop on the rail 16 comprises a portion 36 which is mobile in translation with respect to the body 31. The mobile portion 36 is provided with transverse flanges 38 for clamping the rail 16.

Naturally, in a variant, it will be possible to use a single shock absorbing element or more than two shock absorbing elements 57 for an assembly 53 of two sets. That depends on the application.

The invention can also be used with seats installed in other transport means such as bus, train or boat seats, for example.

Quite obviously, the invention is not limited to the embodiments described above and provided only as examples. It encompasses various modifications, alternative forms and other variants which the person skilled in the art can consider in the context of the present invention and in particular any combinations of the different operating modes described above which can be considered separately or in combination.

The invention claimed is:

1. An assembly comprising:
   a seat support pallet comprising a reinforcement panel spanning between two opposing spars, at least one of the spars coupled with a first beam at a first end and a second beam at a second end, the seat support pallet having fastening devices for fastening to an aircraft seat, and at least one fastener for fastening to an aircraft cabin rail, and
   a stop for the aircraft seat, wherein the stop is designed to be installed on the rail spaced apart from the fastener, the rail having, in alternation, bearing regions, in which two lips that are oriented toward one another project toward an interior of the rail, and open regions,
   wherein the stop comprises:
      a body provided with a plunger which is designed to fit into an open region of the rail so as to abut against lips of a bearing region, and
      at least one means for holding said stop on said rail.

2. The assembly of claim 1, wherein a spacing between the stop and the fastener is between 2 mm and 3 mm.

3. The assembly of claim 1, wherein a shock absorbing element is mounted between a beam of the seat support pallet and an aircraft cabin rail.

4. The assembly of claim 3, wherein the shock absorbing element protrudes with respect to an aircraft cabin floor.

5. The stop of claim 1, wherein the holding means comprises a portion which is mobile in translation with respect to the body, said mobile portion being provided with at least one transverse flange for clamping a lip of the rail between said transverse flange and the body of the stop.

6. The stop of claim 5, wherein the stop comprises two sets of transverse flanges located on both sides of the plunger.

7. An assembly comprising:
   a seat support pallet having fastening devices for fastening to an aircraft seat, and at least one fastener for fastening to an aircraft cabin rail, and
   a stop for the aircraft seat, wherein the stop is designed to be installed on the rail spaced apart from the fastener, the rail having, in alternation, bearing regions, in which two lips that are oriented toward one another project toward an interior of the rail, and open regions,
   wherein the stop comprises:
      a body provided with a plunger which is designed to fit into an open region of said rail so as to abut against lips of a bearing region, and
      at least one means for holding said stop on said rail
   wherein a shock absorbing element is mounted between a beam of the seat support pallet and an aircraft cabin rail, wherein the shock absorbing element protrudes with respect to an aircraft cabin floor and comprises:
      a body,
      a portion made of resilient material fastened to the body, and
      at least one means for holding the stop on the rail.

8. The assembly of claim 7, wherein the shock absorbing element is provided with a plunger which is designed to fit into an open region of said rail so as to abut against lips of a bearing region.

9. The assembly of claim 7, wherein the shock absorbing element comprises a portion which is mobile in translation with respect to the body, said mobile portion being provided with at least one transverse flange for clamping the rail between the transverse flange and the body of the shock absorbing element.

* * * * *